United States Patent
Wind et al.

(10) Patent No.: US 12,333,525 B1
(45) Date of Patent: Jun. 17, 2025

(54) SYSTEMS AND METHODS FOR DYNAMIC APPLICATION OF TOKENS IN CREDIT AUTHORIZATION

(71) Applicant: Worldpay, LLC, Symmes Township, OH (US)

(72) Inventors: Andrew Wind, Minneapolis, MN (US); Derrick Koes, Pelham, NH (US); Tao Hong, Acton, MA (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 16/718,444

(22) Filed: Dec. 18, 2019

(51) Int. Cl.
*G06Q 20/36* (2012.01)
*G06Q 20/02* (2012.01)
*G06Q 20/20* (2012.01)
*G06Q 20/38* (2012.01)
*G06Q 20/40* (2012.01)

(52) U.S. Cl.
CPC ......... *G06Q 20/3674* (2013.01); *G06Q 20/02* (2013.01); *G06Q 20/20* (2013.01); *G06Q 20/381* (2013.01); *G06Q 20/401* (2013.01); *G06Q 20/4097* (2013.01); *G06Q 2220/123* (2013.01)

(58) Field of Classification Search
None
See application file for complete search history.

(56) References Cited

U.S. PATENT DOCUMENTS

| | | | | |
|---|---|---|---|---|
| 9,773,246 B2* | 9/2017 | Faith | ................. | G06Q 30/0202 |
| 2009/0292925 A1* | 11/2009 | Meisel | ............... | H04L 63/0876 |
| | | | | 713/176 |
| 2010/0036945 A1* | 2/2010 | Allibhoy | ........... | G06Q 20/0855 |
| | | | | 709/224 |
| 2010/0287099 A1* | 11/2010 | Liu | ....................... | G06Q 20/40 |
| | | | | 235/380 |

(Continued)

FOREIGN PATENT DOCUMENTS

| | | | | |
|---|---|---|---|---|
| WO | WO-2015013548 A1 * | 1/2015 | .......... | G06Q 20/385 |
| WO | WO-2015054697 A1 * | 4/2015 | ............ | G06Q 20/12 |

OTHER PUBLICATIONS

Liu, X., "Integrating security and privacy protection into a mobility-centric Internet architecture", Rutgers SUNY, ProQuest Dissertations & Theses. (2016) (Year: 2016).*

*Primary Examiner* — Clay C Lee
(74) *Attorney, Agent, or Firm* — Bookoff McAndrews, PLLC

(57) ABSTRACT

A computer-implemented method for optimizing transaction authorization conversion rates based on the use of network tokens may include receiving, at an acquirer processor, a payment transaction from a merchant, determining whether the payment transaction includes a network token, upon determining that the payment transaction does not include a network token, determining whether the payment transaction should be modified to include a network token based on a likelihood that the payment transaction will be authorized by a financial institution will be increased when the payment transaction includes a network token, upon determining (Continued)

whether the payment transaction should be modified to include a network token, obtaining a network token for the payment transaction, and modifying the payment transaction to include the obtained network token, and submitting the modified payment transaction to the financial institution for processing.

20 Claims, 7 Drawing Sheets

(56) References Cited

U.S. PATENT DOCUMENTS

| | | | | |
|---|---|---|---|---|
| 2013/0304648 | A1* | 11/2013 | O'Connell | G07C 9/10 |
| | | | | 705/44 |
| 2015/0081462 | A1* | 3/2015 | Ozvat | G06Q 20/027 |
| | | | | 705/21 |
| 2016/0086222 | A1* | 3/2016 | Kurapati | G06Q 40/08 |
| | | | | 705/14.53 |
| 2016/0269391 | A1* | 9/2016 | Gaddam | H04L 63/0807 |
| 2017/0200150 | A1* | 7/2017 | Cohn | G06Q 20/38215 |
| 2017/0200165 | A1* | 7/2017 | Laxminarayanan | H04L 9/3297 |
| 2019/0019185 | A1* | 1/2019 | Chitalia | G06Q 20/383 |
| 2019/0303807 | A1* | 10/2019 | Gueye | G06Q 20/3224 |
| 2020/0034837 | A1* | 1/2020 | Narayan | G06Q 20/38215 |
| 2020/0410483 | A1* | 12/2020 | Dill | G06Q 20/4016 |
| 2021/0097539 | A1* | 4/2021 | Nanduri | G06Q 20/405 |

* cited by examiner

US 12,333,525 B1

SYSTEMS AND METHODS FOR DYNAMIC APPLICATION OF TOKENS IN CREDIT AUTHORIZATION

TECHNICAL FIELD

Various embodiments of the present disclosure relate generally to the field of electronic transaction processing and, more particularly, to optimizing authorization requests for higher transaction conversion rates.

BACKGROUND

Electronic transactions and networks are used for a great number of purchases and sales between merchants and bank card holders. A normal bank card transaction may involve a number of parties, including an account holder who possesses a card, a merchant, an acquirer processor, an issuer processor, an issuer financial institution, and a card association network. Millions of such transactions occur daily at merchants using a variety of payment card types, such as credit cards, debit cards, prepaid cards, and so forth. A transaction based on account information received from an account holder may be declined for a number of different reasons, such as insufficient funds, card expiration, expired account information, or a variety of other occurrences. However, additional factors, such as the presence or absence of some items of account information, may also affect the rate of acceptance, or conversion, of payment transactions.

In addition, one reality of the modern Internet-connected world is that the storage and transfer of sensitive and secure electronic data is potentially vulnerable to data breaches. Further, as electronic systems, such as point of sales ("POS") systems, become more complex, and as hackers become more sophisticated, security concerns are continually increasing.

In the early days of electronic transactions, dedicated magnetic card readers would scan unencrypted sensitive data on a credit card and transfer it to a transaction service for completion of the transaction. These communications were typically made over a dial-up connection and required basic encryption in the reader device in order to maintain security of the packet.

Over time, the reader devices have become more advanced, often with Internet connections and data input ports that enable malware to infect POS terminals. Further, as more and more merchants have moved to transfer data over the Internet, additional security features have been developed.

Most notably, "tokenization" is a means for replacing sensitive data with a "token" of data that may be non-decryptable or non-detokenizable by the merchant or other tokenization users (e.g. because they require third party decryption). Merchants, for example, might not ever store sensitive data themselves, thus enhancing data security.

Tokenization has become a popular method for securing payment transaction data (e.g., primary account numbers, etc.) and many disparate token service providers have emerged to provide this functionality. A client, such as a merchant, may want to bundle functionalities from multiple transaction processing services that do not share common token service providers. Since each token service provider may be proprietary and may not share data with others, there has been no option for a client to operate across token boundaries (i.e., across transaction platforms utilizing disparate tokens) in a secure manner.

Financial institutions, thus, may have a preference for transaction requests including tokenized data and may preferentially approve such transactions even in the presence of other factors that may lead to a declined transaction.

Declined transactions may lead to a variety of undesirable outcomes for the merchant and the account holder. Conventional methods for submitting electronic transactions may submit such transactions according to factors specific to the acquirer processor or to the merchant, but do not consider factors that might be shown to affect transaction conversion in past transactions, including the use of network tokens.

The present disclosure is directed to overcoming one or more of these above-referenced challenges.

SUMMARY OF THE DISCLOSURE

According to certain aspects of the present disclosure, systems and methods are disclosed for optimizing transaction authorization conversion rates based on the use of network tokens.

In one embodiment, a computer-implemented method is disclosed for optimizing transaction authorization conversion rates based on the use of network tokens, the method comprising: receiving, at an acquirer processor, a payment transaction from a merchant, determining whether the payment transaction includes a network token, upon determining that the payment transaction does not include a network token, determining whether the payment transaction should be modified to include a network token based on a likelihood that the payment transaction will be authorized by a financial institution will be increased when the payment transaction includes a network token, upon determining whether the payment transaction should be modified to include a network token, obtaining a network token for the payment transaction, and modifying the payment transaction to include the obtained network token, and submitting the modified payment transaction to the financial institution for processing.

In accordance with another embodiment, a system is disclosed for optimizing transaction authorization conversion rates based on the use of network tokens, the system comprising: a data storage device storing instructions for optimizing transaction authorization conversion rates based on the use of network tokens in an electronic storage medium; and a processor configured to execute the instructions to perform a method including: receiving, at an acquirer processor, a payment transaction from a merchant, determining whether the payment transaction includes a network token, upon determining that the payment transaction does not include a network token, determining whether the payment transaction should be modified to include a network token based on a likelihood that the payment transaction will be authorized by a financial institution will be increased when the payment transaction includes a network token, upon determining whether the payment transaction should be modified to include a network token, obtaining a network token for the payment transaction, and modifying the payment transaction to include the obtained network token, and submitting the modified payment transaction to the financial institution for processing.

In accordance with another embodiment, a non-transitory machine-readable medium storing instructions that, when executed by the a computing system, causes the computing system to perform a method for optimizing transaction authorization conversion rates based on the use of network tokens, the method including: receiving, at an acquirer processor, a payment transaction from a merchant, determining whether the payment transaction includes a network token, upon determining that the payment transaction does not include a network token, determining whether the payment transaction should be modified to include a network token based on a likelihood that the payment transaction will be authorized by a financial institution will be increased when the payment transaction includes a network token, upon determining whether the payment transaction should be modified to include a network token, obtaining a network token for the payment transaction, and modifying the payment transaction to include the obtained network token, and submitting the modified payment transaction to the financial institution for processing.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
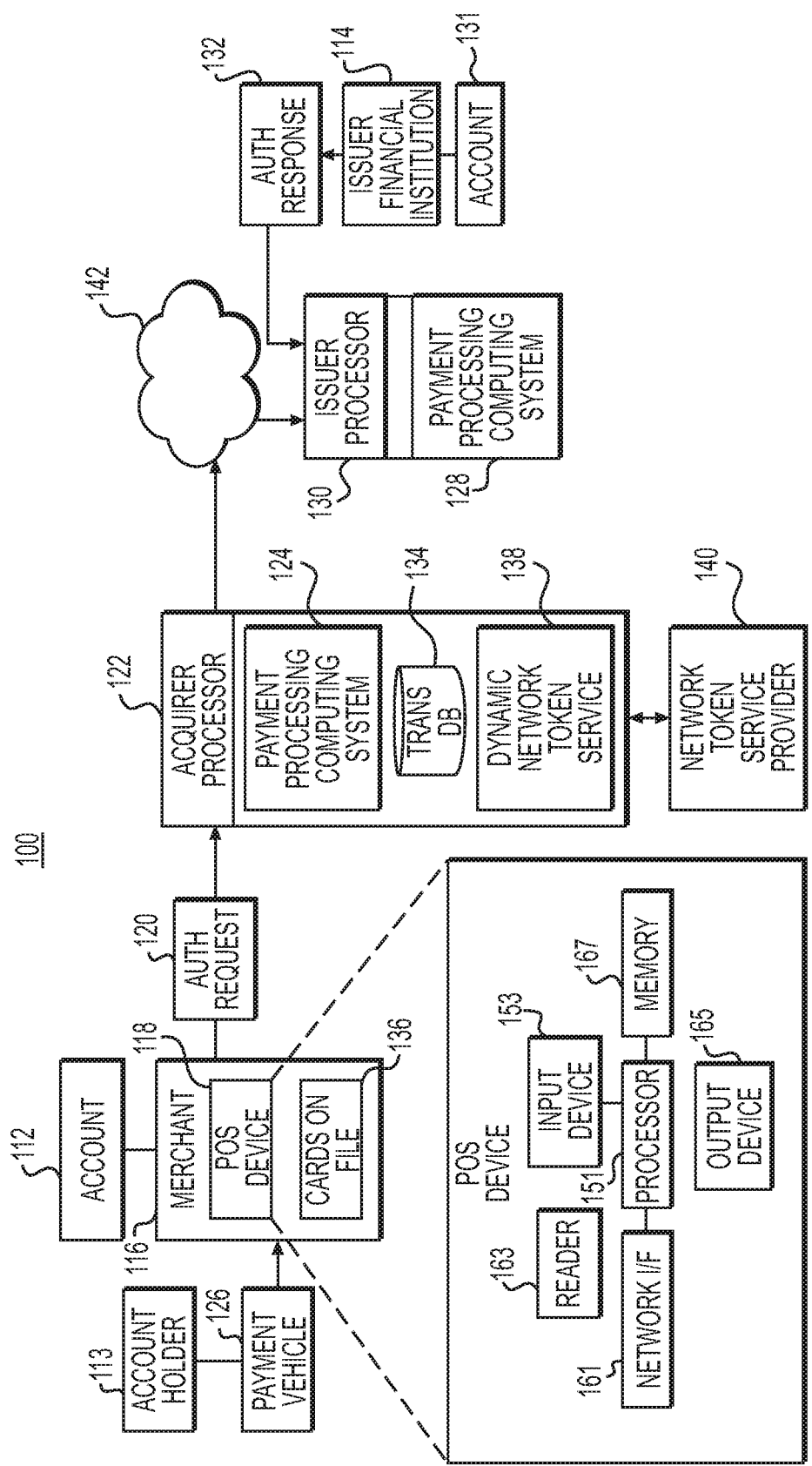
FIG. 1 depicts a block diagram of an example payment system and network in which optimizing transaction authorization conversion rates based on the use of network tokens, according to one or more embodiments.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for the scheduling of transaction payment requests.

For simplicity, the description that follows will be provided by reference to a "payment vehicle," which generally refers to any type of financial alternative to currency. As is to be clear to those skilled in the art, no aspect of the present disclosure is limited to a specific type of payment vehicle. Therefore, it is intended that the following description encompasses the use of the present disclosed techniques with many other forms of financial alternatives to currency, including credit cards, debit cards, smart cards, single-use cards, pre-paid cards, electronic currency (such as might be provided through a cellular telephone or personal digital assistant), and the like. Payment vehicles may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle may also have electronic functionality provided by a network of electronic circuitry that is printed or otherwise incorporated onto or within the payment vehicle (and typically referred to as a "smart card"), or be a fob having a transponder and an RFID reader, or may operate as a mobile wallet or by near field communication (NFC).

Tokenization of payment vehicle information in authorization requests is used as a method to provide data security for sensitive data, such as a primary account number (PAN). Through tokenization, a requesting client may be given non-sensitive reference data in exchange for the sensitive data elements. The reference data may be considered non-sensitive since the associated sensitive data may only be retrieved through security controls that authenticate and authorize the requestor. This allows clients to store non-sensitive reference data and to offload any sensitive data storage to tokenization providers, reducing auditing requirements as well as any potential sensitive data loss should a security incident occur.

The following discussion relates to methods and systems for optimizing authorization requests for higher transaction conversion rates through dynamic use of network tokens during authorization. Such methods and systems may infer the sensitivity of payment vehicle issuer preferences for the use of network tokens and may dynamically change elements of an authorization to improve the likelihood of approval.

As described above, declined transaction payment requests may lead to undesirable outcomes, and associated increased costs, for merchants and account holders. Thus, the embodiments of the present disclosure are directed to improving (i.e., increasing) the successful authorization of transaction payment requests.

In accordance with one or more embodiments, and as described in more detail below, an acquirer processor may maintain a database of past transactions and the associated authorization results. Analysis of these transaction results by statistical methods or other means may be used to determine patterns of acceptance or denial of transaction payment requests based on factors associated with the transactions, including, for example, presence of a billing address, presence of a card verification code (CVV), the merchant categorization code (MCC), presence of an expiration date, etc. The transaction may be modified with respect to these factors, as determined at least in part by such an analysis of historical authorization success rates. According to one or more embodiments, a modified authorization request may be submitted to the payment network.

One or more examples of these non-limiting embodiments are illustrated in the selected examples disclosed and described in detail with reference to FIGS. 1-7 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an example payment environment 100 for optimizing transaction authorization conversion rates based on the use of network tokens. In the example payment environment 100, a payment vehicle 126 (e.g., a credit card) may be issued to an account holder 113 by an issuer financial institution 114. Issuer financial institution 114 may be any of a variety of financial institutions that is capable of issuing a payment vehicle to an account holder. Payment vehicle 126 may be used to pay a merchant 116 for a purchase transaction at a merchant point of sale (POS) device 118. Merchant POS device 118 may be any device that facilitates receipt of a payment vehicle for payment of a purchase, such as for example, a POS terminal or a web interface. Further, merchant 116 may be any type of merchant or service provider, such as, for example, a brick-and-mortar merchant, an online merchant, a mobile merchant, a kiosk, or any other type of merchant or device configured to receive payment cards, or electronic or mobile wallets, from account holders as a form of payment.

POS device 118 may be configured to interact with payment vehicle 126 to obtain account information about a consumer account affiliated with account holder 113. As shown in the depicted callout of POS device 118, in one or more embodiments, POS device 118 may include a memory 167 coupled to processor 151, which may control the operations of a reader 163, an input device 153, an output device 165, and a network interface 161. Memory 167 may store instructions for processor 151 and/or data, such as, for example, an identifier that is associated with merchant account 112.

In one or more embodiments, reader 163 may include a magnetic strip reader. In one or more embodiments, reader 163 may include a contactless reader, such as, for example, a radio frequency identification (RFID) reader, a near field communications (NFC) device configured to read data via magnetic field coupling (in accordance with ISO standard 14443/NFC), a Bluetooth transceiver, a Wi-Fi transceiver, an infrared transceiver, a laser scanner, and so forth.

In one or more embodiments, input device 153 may include key buttons that may be used to enter the account information directly into POS device 118 without the physical presence of payment vehicle 126. Input device 153 may be configured to provide further information to initiate a transaction, such as, for example, a personal identification number (PIN), password, zip code, etc., or in combination with the account information obtained from payment vehicle 126. In one or more embodiments, output device 165 may include a display, a speaker, and/or a printer to present information, such as, for example, the result of an authorization request, a receipt for the transaction, an advertisement, and so forth.

In one or more embodiments, network interface 161 may be configured to communicate with acquirer processor 122 such as, for example, via a telephone connection, an Internet connection, or a dedicated data communication channel.

In one or more embodiments, the instructions stored in memory 167 may be configured at least to cause POS device 118 to send an authorization request message to acquirer processor 122 to initiate a transaction. POS device 118 may or may not send a separate request for the clearing and settling of the transaction. The instructions stored in memory 167 also may be configured to cause POS device 118 to perform other types of functions discussed in this description.

In one or more embodiments, POS device 118 may have fewer components than those illustrated in FIG. 1. For example, in one or more embodiments, POS device 118 may be configured for "card-not-present" transactions; and POS device 118 may not have a reader 163. In one or more embodiments, POS device 118 may have more components than those illustrated in FIG. 1.

During a purchase event, merchant POS device 118 may send an authorization request 120 for the purchase transaction to acquirer processor 122 that processes payment vehicle transactions for merchant 116. Additional intermediary entities, such as one or more payment gateways, may assist with the handling and routing of authorization request 120 or other related messaging. For the purposes of illustration, such intermediary entities may be considered part of acquirer processor 122. Authorization request 120 may include identifying information from payment vehicle 126, such as a BIN number, an expiration date, and a first and last name of the account holder, for example. Authorization request 120 may further include identifying information from the purchase, such as an amount and identifying information from merchant POS device 118 and/or merchant 116, for example.

In one or more embodiments, payment vehicle 126 may be used to establish a recurring billing arrangement between account holder 113 and merchant 116. An initial transaction may allow merchant 116 to store account information that may be used for subsequent billing events. The account information may be stored in a cards-on-file storage 136. For example, the purchase event illustrated in FIG. 1 may be associated with a subscription, membership plan, installment payment plan between merchant 116 and account holder 113, and so on. For subsequent transactions, merchant 116 may access cards-on-file storage 136 to retrieve the relevant account information. The subsequent transactions may not require direct involvement from account holder 113. In one or more embodiments, account holder 113 may trigger the subsequent transaction, but may not provide payment vehicle 126 to merchant 116, as merchant 116 may access the cardholder's account information in cards-on-file storage 136.

A payment processing computing system 124 at acquirer processor 122 may receive authorization request 120 from merchant 116. A network token and cryptogram for authorization request 120 may be obtained by dynamic network token service 138, such as by a request to network token service provider 140.

The network token may be, for example, a randomly generated number. The token may also be a pseudorandom number, encrypted information, or other character sequence.

The token may be unique per customer/person or account number per merchant or organization. Thus, if a given user makes a purchase at merchant A, token A may be generated, but if a given user makes a purchase at merchant B, even if using the same credit card, token B may be generated.

By relying upon a token, a merchant system 116 may no longer be required to send credit card information or other sensitive data for subsequent transactions, and may instead use the token, such as for follow-up activities. For example, a restaurant may initially run a transaction for the cost of a meal, and perform a follow-up transaction using the token for processing the tip. Alternatively, in a card-not-present context, an online merchant may run multiple transactions for a recurring web subscription using one or more tokens. Another example may include recurring transactions for a gym membership. A merchant may use tokens for returns or price adjustments rather than resending sensitive transaction information over a network. Using tokenization, a merchant or merchant may enhance security by not storing sensitive data of customers on its own systems.

The operation of dynamic network token service 138 and network token service provider 140 will be discussed in greater detail below.

Payment processing computing system 124 may translate authorization request 120, if necessary, and may provide authorization request 120 to a payment network 142. Payment network 142 may be, for example, a network of a credit card association affiliated with payment vehicle 126. Non-limiting examples of credit card associations include VISA, MASTERCARD, DISCOVER, and AMERICAN EXPRESS, and so on. Authorization request 120 then may be provided to a payment processing computing system 128 at an issuer processor 130. In response to receiving the authorization request, and based on the type of payment vehicle 126, payment processing computing system 128 may provide authorization request 120 to issuer financial institution 114. Using information from authorization request 120, issuer financial institution 114 may associate the purchase transaction with an account 131 of account holder 113 held by issuer financial institution 114. Issuer financial institution 114 then may send an authorization response 132 which may either approve or deny the transaction. Authorization response 132 may be provided to payment processing computing system 128 at issuer processor 130 and then provided to payment network 142. Authorization response 132 then may be provided to payment processing computing system 124 at acquirer processor 122. Upon receiving authorization response 132, payment processing computing system 124 may send either an approval message or a denial message to merchant POS device 118 to complete the purchase transaction. If the purchase transaction is approved, it may be posted to account holder's account 131 and reconciled later with account holder 113 and merchant 116.

Transaction records may be stored in one or more locations within system 100. In one or more embodiments, the transaction record may be stored within a transaction data database 134 of acquirer processor 122. The transaction data may be received by transaction data database 134 from various sources, such as merchant POS device 118, merchant 116, acquirer processor 122, and so on. A plurality of transaction parameters associated with the purchase transaction may be stored in each transaction record, which may generally be used for settlement and financial recordkeeping. While the transaction parameters stored in each transaction record may vary, example transaction parameters may include, without limitation, account number, card number, payment vehicle information, product information (such as product type, product serial number, and so forth), loyalty account information, merchant information, transaction amount, response code, transaction date, transaction time, whether the transaction was a "card present" transaction, and so on.

Figure 2:
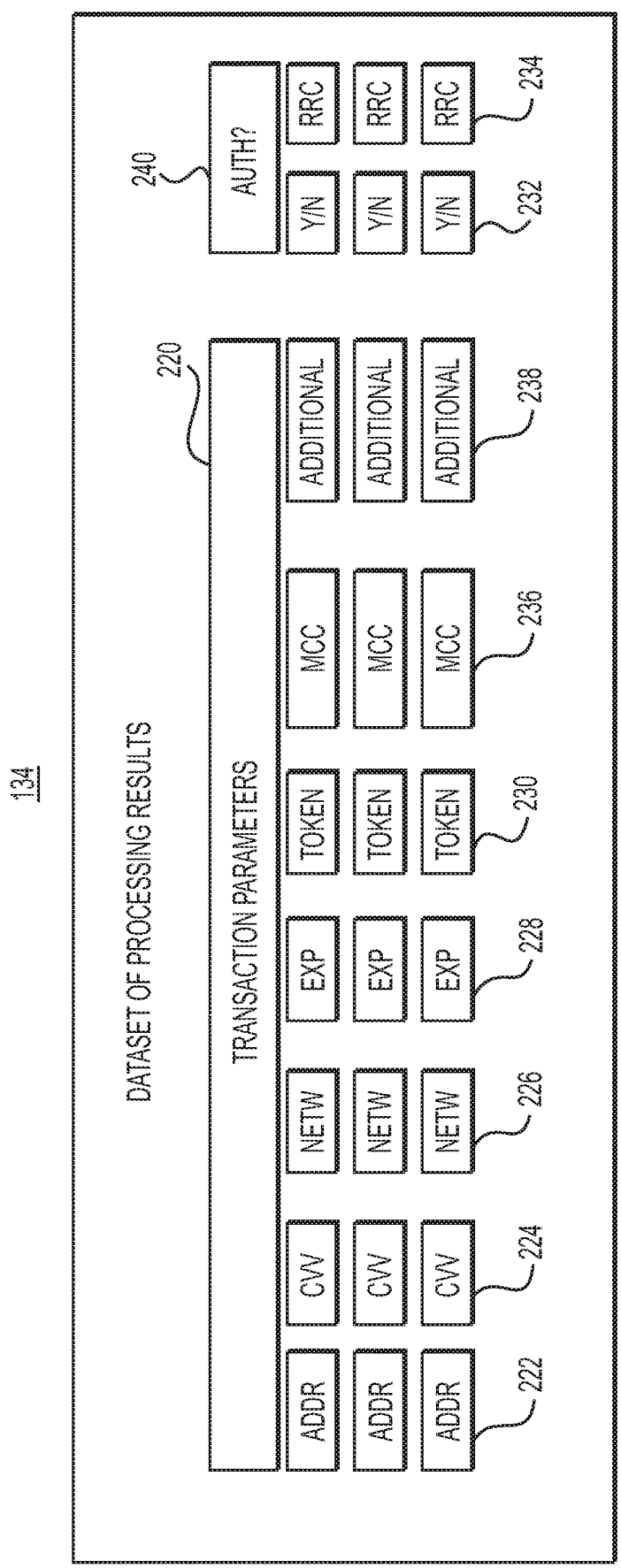
FIG. 2 depicts a dataset of processing results, according to one or more embodiments.
Figure 3:
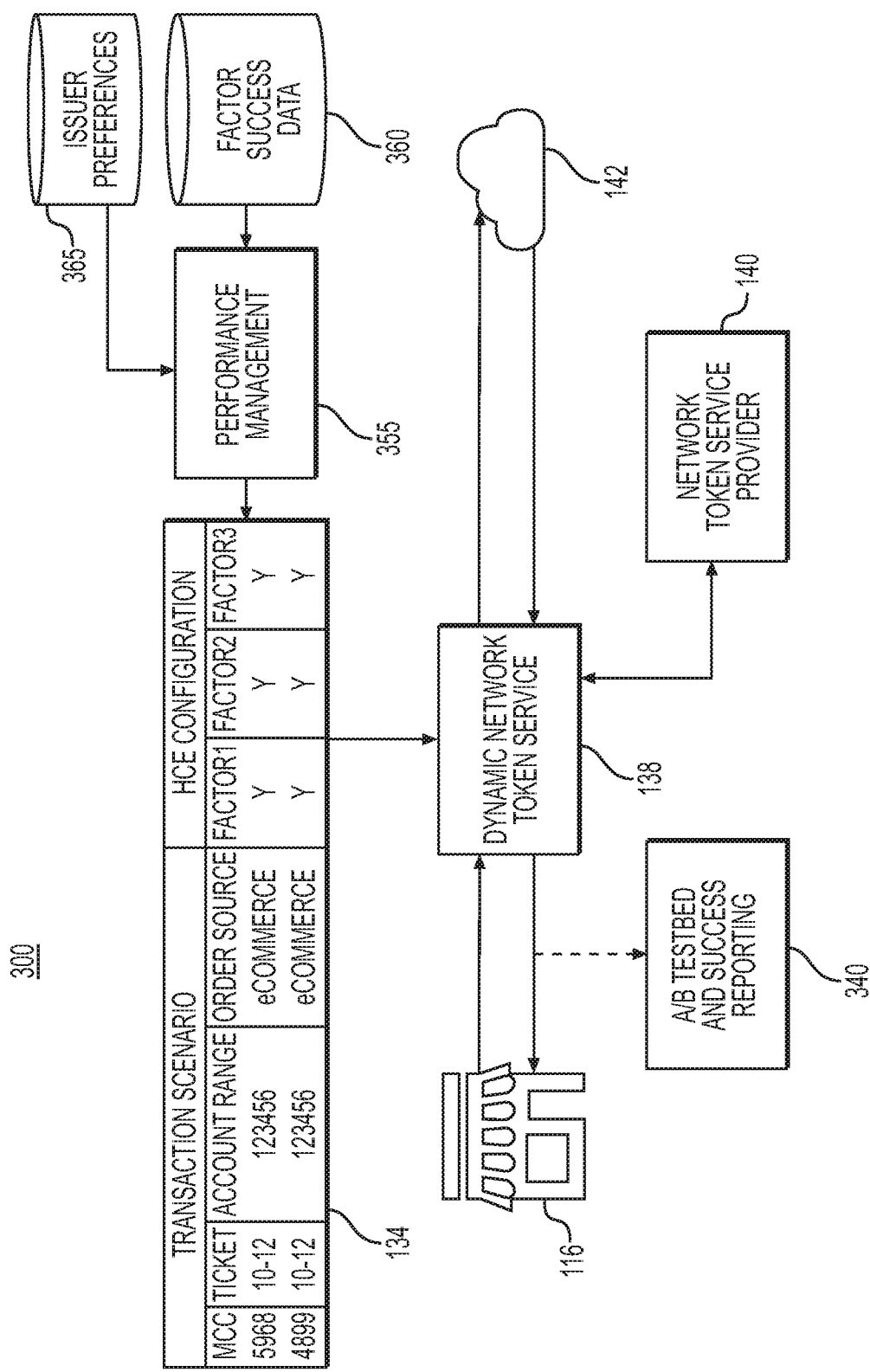
FIG. 3 depicts a block diagram of an example process logic flow for optimizing transaction authorization conversion rates based on the use of network tokens, according to one or more embodiments.

FIG. 2 depicts a dataset of processing results, according to one or more embodiments. Dataset of processing results 134 may include historical transaction information that may be processed and analyzed in order to optimize transaction conversion rates, as shown in FIG. 3 based on, for example, an analysis of trends and/or correlations. Dataset 134 may include transaction parameters 220 such as, for example, a billing address 222, a card verification value (CVV) 224, whether a network token 226 was submitted, a payment vehicle expiration date 228, a payment vehicle issuer token 230, a merchant classification code (MCC) 236, and additional parameters 238. Dataset 134 may also include an authorization result 240, which may indicate whether the particular combination of transaction parameters 220 led to an authorization (232) and a reason response code (RRC) related to the authorization result (234). Further, while dataset of processing results 134 may include many different transaction parameters 220, in some embodiments only a subset of the parameters may be used for optimizing transaction authorization conversion rates.

FIG. 3 depicts a block diagram of an example process logic flow for optimizing transaction authorization conversion rates based on the use of network tokens, according to one or more embodiments. As shown in FIG. 3, a process for optimizing transaction authorization conversion rates may include identifying factors for authorization of transaction requests to produce a database of transaction requests 134. For example, such identification may include applying data science methods to database of transaction requests 134. However, other methods may be used such as machine learning, etc. Database of transaction requests 134 may further include information produced by performance manager 355 based on issuer preferences 365 and factor success data 360, possibly in conjunction with a process or generating and updating factor success data 360. For example, performance manager 355 may interpret issuer preferences 365 to determine whether an issuer associated with payment vehicle 126 prefers to receive network token for an authorization request, such as authorization request 120. However, analysis of factor success data 360 may indicate that for some authorization requests, issuer preferences 365 may be overridden with respect to the use of a network token. Issuer preferences 365 may include preferences for the specification of other transaction parameters 220. Performance manager 355 may interpret issuer preferences 365 with respect to these parameters and may give added weight to the issuer preferences. However, issuer preferences 365 may be overridden with respect to the setting or alteration of these transaction parameters.

Factor success data 360 may aggregate test and control groups. Data stored in factor success data 360 may be used to determine the effectiveness of optimizing transaction requests, such as by comparing results for optimized transactions (test transactions) and non-optimized transactions (control transaction). Such a determination may be specific to particular factors employed for optimization of test transactions. Factor success data 360 may further include measurement, for example, at the level of the specific issuer and account range (generally associated with a card product of a particular issuer), of the sensitivity of a factor. That is, an assessment of whether a manipulation (inclusion, exclusion, alteration) of a factor resulted in an improvement or decrease in the rate of authorization approvals at that issuer/account range. Performance manager 355 may automatically calibrate optimization factors employed by dynamic network token service 138 through analysis of factor success data 360 and transaction scenarios stored in dataset of processing results 134. Performance management may include, for example, the modification of prior rules based on continuing assessment of the results from transactions sent to the issuer/account range. It may include and take into account negative results besides the authorization denial, such as an increase in the rate of chargebacks or fraud alerts generated by the issuer. These negative effects may occur, for example, even if the authorization is approved.

A merchant, such as merchant 116 depicted in FIG. 1, may submit a transaction request, such as authorization request 120 depicted in FIG. 1, to acquirer processor 122. The transaction request may be interpreted by dynamic network token service 138 of the acquirer processor based on the database of transaction requests, issuer preferences 365, and the factor success data 360. For example, if preferred by issuer preferences 365 and supported by the analysis performed by performance manager 355, dynamic network token service (DNTS) 138 may call network token service provider (NTSP) 140 to obtain a network token and cryptogram. In some embodiments, the call to the NTSP may return immediately before generating the network token. This ensures that the NTSP call has low latency and may allow the dynamic network token service to continue processing the request without waiting for the initial NTSP call to complete. Once the network token is prepared, or the processing by the NTSP is otherwise completed, the network token or other processing result may be returned to the dynamic network token service by any of a callback method, shared memory, or any other suitable means.

If a network token is obtained from NTSP 140, authorization request 120 may be altered to include the network token in place of sensitive information. Authorization request 120 may then be provided to payment network 142. In some embodiments, the network token may be used for subsequent related transactions including, for example, deposit transactions, refund transactions, and authorization reversal transactions. Use of the network token for subsequent related transactions may facilitate identification of related transactions during later processing.

In some embodiments, a cryptogram returned by NTSP 140 may be provided to issuer processor 130. The cryptogram may be provided in the authorization request or through an alternative communication channel. Issuer processor 130 may utilize the cryptogram while processing an authorization request including a network token. Providing the cryptogram to issuer processor 130 may ensure that the authorization request is accepted.

In some embodiments, if an authorization request including a network token is declined then DNTS 138 may resubmit the authorization request with the sensitive information restored in place of the network token.

In some embodiments, DNTS 138 may validate the formatting of data items returned by NTSP 140. For example, if a date format for an expiration date of a network token returned by NTSP 140 does not match a format required by issuer processor 130, DNTS 138 may correct the format of the date or my substitute a null date.

In some embodiments, DNTS 138 may handle generated network tokens on behalf of merchant 116 without the knowledge of merchant 116 and without changing the behavior of other portions of the system. For example, a chargeback for a transaction submitted with a generated network token may be marked with the deposit identifier of the matching deposit rather than the generated network token. In another scenario, detailed information for a chargeback may show both the generated network token as well as the deposit's identifier. That is, when the chargeback has a deposit ID and the deposit has a different account number than the chargeback then a display of the chargeback case detail may show the sensitive information of the transaction, such as the PAN along with the network token information. In another scenario, when a chargeback is entered for a transaction submitted with a generated network token that is different from the original deposit's account number, a search of transaction information using the original deposit's account number may return both the original deposit transaction and the chargeback.

In some embodiments, DNTS 138 may recognize that a transaction request includes a network token and may not generate an additional network token for the transaction request.

In some embodiments, DNTS 138 may not request a network token from NTSP 140 if the transaction request is for a refund transaction.

The transaction processing by the acquirer processor may also include a validation and reporting functions, such as A/B testing and reporting of authorization success metrics 340. Such reporting functions may further include storing communications between DNTS 138 and NTSP 140 for later analysis and diagnosis of transaction request failures.

Figure 4:
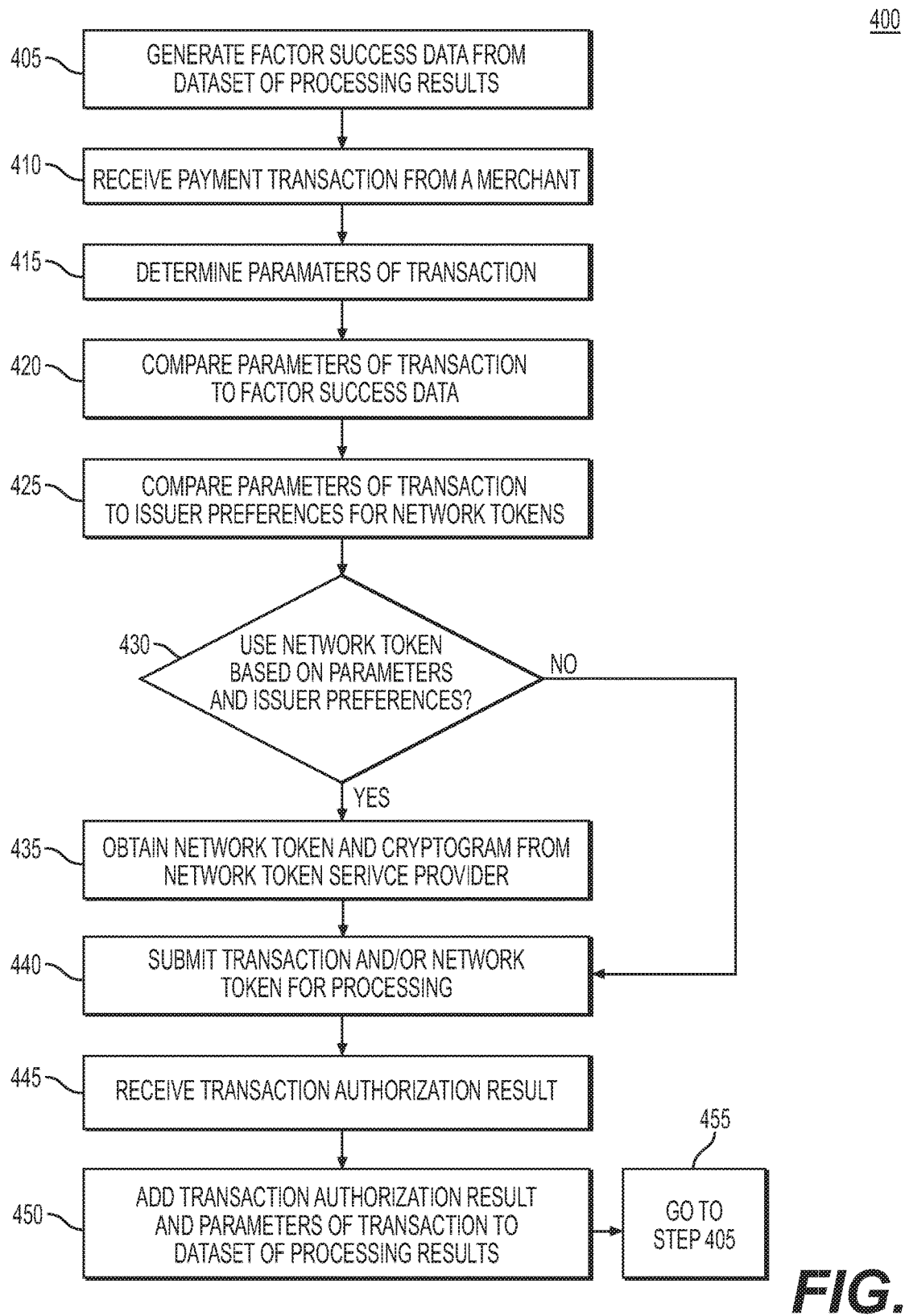
FIG. 4 is a flow chart depicting an example process for optimizing transaction authorization conversion rates based on the use of network tokens, according to one or more embodiments.

FIG. 4 is a flow chart depicting an example process for optimizing transaction authorization conversion rates based on the use of network tokens, according to one or more embodiments. As shown in FIG. 4, at operation 405, acquirer processor 122 may generate factor success data, such as factor success data 360 depicted in FIG. 3, from a dataset of processing results, such as transaction database 134 depicted in FIG. 1, and issuer preferences 365 depicted in FIG. 3. For example, generating factor success data may include applying data science methods, machine learning, or other suitable methods to the dataset of processing results. At operation 410, acquirer processor 122 may receive a payment transaction from a merchant, such as merchant 116 depicted in FIG. 1. The payment transaction may include, in addition to a transaction amount, primary account identifier, customer identification, etc., for example, a billing address, a card verification value (CVV), a payment processing network, a payment vehicle expiration date, a payment vehicle issuer token, a merchant classification code (MCC), and additional parameters. At operation 415, acquirer processor 122 may determine parameters of the payment transaction, such as authorization request 120 depicted in FIG. 1. Determining the parameters of the payment transaction may include identifying parameters that are not present in the transaction, such as the CVV, expiration data, billing address, etc. At operation 420, acquirer processor 122 may compare one or more parameters of the payment transaction to the factor success data. Such comparison may include applying factor weights from the factor success data to the parameters of the transaction. Such factor weights may be determined by any suitable method, including, for example, statistical methods including regression analysis, machine learning, artificial intelligence methods such as neural networks, etc. At operation 425, acquirer processor 122 may compare one or more parameters of the payment transaction to issuer preferences for network tokens. For example, issuer preferences 365 may indicate that a network token should be used for all transactions, for no transactions, or for transactions having particular combinations of transaction parameters. At operation 430 acquirer processor 122 may determine whether to use a network token based on the parameters of the payment transaction and the issuer preferences. if acquirer processor 122 determines a network token should be used, then at operation 435, acquirer processor 122 may obtain network token and cryptogram from a network token service provider, such as network token service provider 140 depicted in FIG. 3. Processing may then continue with operation 440. At operation 440, acquirer processor 122 may submit the transaction for processing by an issuer processor, such as issuer processor 130 depicted in FIG. 1. If a network token was obtained in operation 435, then the transaction may be modified to include the network token in place of sensitive information prior to submission to the issuer processor. At operation 445, acquirer processor 122 may receive a transaction authorization result from the issuer processor. At operation 450, acquirer processor 122 may add the transaction authorization result and the parameters of the payment transaction to the dataset of processing results. The process may then resume at operation 405 in order to process subsequent transactions.

Figure 5:
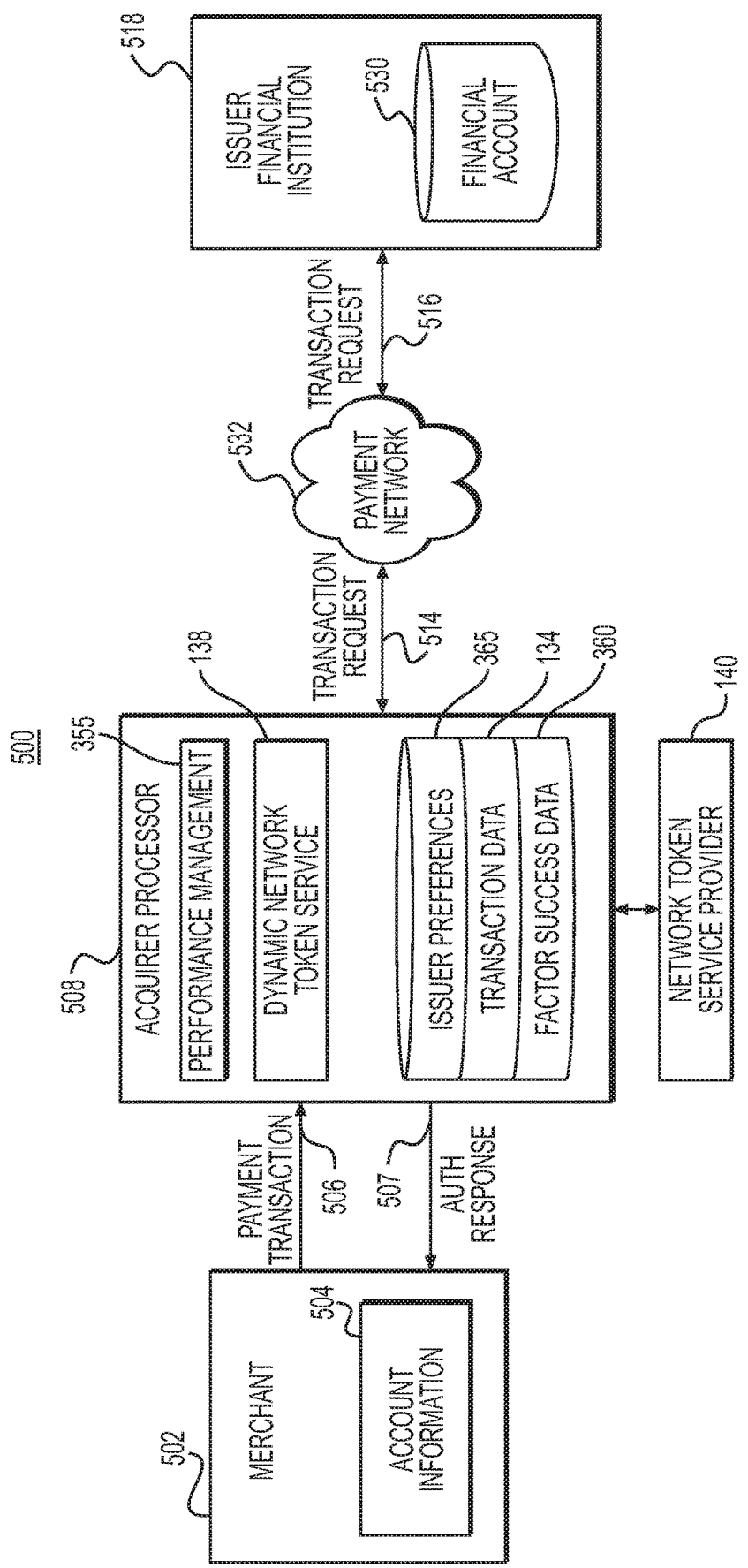
FIG. 5 depicts a block diagram of an example system and process flow for optimizing transaction authorization conversion rates based on the use of network tokens, according to one or more embodiments.

FIG. 5 depicts a block diagram of an example process flow for optimizing transaction authorization conversion rates based on the use of network tokens, according to one or more embodiments. A payment transaction 506 may be received from a merchant 502 by an acquirer processor 508. Payment transaction 506 may be based on account information 504 maintained by merchant 502, or elsewhere, as may be appropriate. Payment transaction 506 may include typical transaction data, such as, for example, an amount, an account identifier, a billing address, a card verification value (CVV), a payment vehicle expiration date, a payment vehicle issuer token, a merchant classification code (MCC), etc. At least some of the transaction data transmitted in the payment transaction may include data that was originally received by merchant 502 during an initial payment transaction originating with a payment vehicle and stored in a cards-on-file storage 136, for example. A payment processing computing system of acquirer processor 508 may determine the card association that is affiliated with the payment transaction 506 (e.g., VISA, MASTERCARD, and so forth), to determine the proper processing channels for the transaction such as, for example, a payment processing network.

Acquirer processor 508 may transmit an authorization attempt or transaction request 514 to a payment network, which in turn may transmit transaction request 516 to an issuer financial institution 518. Issuer financial institution 518 may approve or reject the authorization request based on a status of a financial account 530 associated with the transaction or cardholder, or other factors, such as, for example, the presence or absence of a billing address, the presence or absence of a card verification value (CVV), the presence or absence of a payment vehicle expiration date, the presence or absence of a payment vehicle issuer token, a merchant classification code (MCC), a selection of a payment processing network, etc. Generally, all authorization requests include an MCC, however some merchants view certain MCCs as riskier than others and therefore the selection of which MCC to include in the authorization requests—assuming the merchant qualifies for more than one—can influence the approval. Issuer financial institution 518 may also preferentially approve transactions including a network token. Such preferential processing may lead to inconsistencies in approval rates between transaction requests including sensitive information, such as a primary account number (PAN), and those including a network token. Such preferential processing may result from issuer financial institution 518 applying distinct fraud rule sets for authorizations including a network token and those including a PAN. These unique rule sets can establish preferences for a specific attribute by issuers for a given authorization. Acquirer processor 508 may store such issue preferences, whether specified expressly by issuer financial institution 518 or inferred by acquirer processor 508, in issuer preferences database 365. A determination of whether to submit payment transaction 506 with a network token may be made by dynamic network token service 138 of acquirer processor 138. If dynamic network token service 138 determines that a network token will be included in payment transaction 506, such a network token may be obtained, for example, from network token service provider 140.

Acquirer processor 508 may communicate the authorization result of transaction request 516 to merchant 502 by, for example, an authorization response 507. Financial account 530 can be any suitable account, such as a DDA account, a gift card account, a prepaid account, or any other type of account that can be linked to or accessed by payment vehicle. The available account balance of financial account 530 may vary over time as the account holder withdraws funds and deposits funds. Transaction requests may be rejected, for example, for reasons associated with financial account 530, such as non-sufficient funds, out-of-date account information, parameters provided with or absent from the transaction request etc. Acquirer processor 508 may store factors associated with transaction request 516, including the inclusion of sensitive information or a network token in the transaction request, in dataset of processing results 134 that may be used to determine a likelihood of authorization or conversion for subsequent transaction requests. As described above with respect to FIG. 2, factors associated with transaction request 516 may include, for example, billing address 222, card verification value (CVV) 224, payment processing network 226, payment vehicle expiration date 228, presence of a payment vehicle issuer token 230, merchant classification code (MCC) 236, additional parameters 238, reason response code (RRC) 234, and so forth. In accordance with one or more embodiments, acquirer processor 508 may, as discussed in greater detail below in reference to FIG. 6, include performance manager 355 to process payment transaction 506 based on transaction data 134 and factor success data 360.

Figure 6:
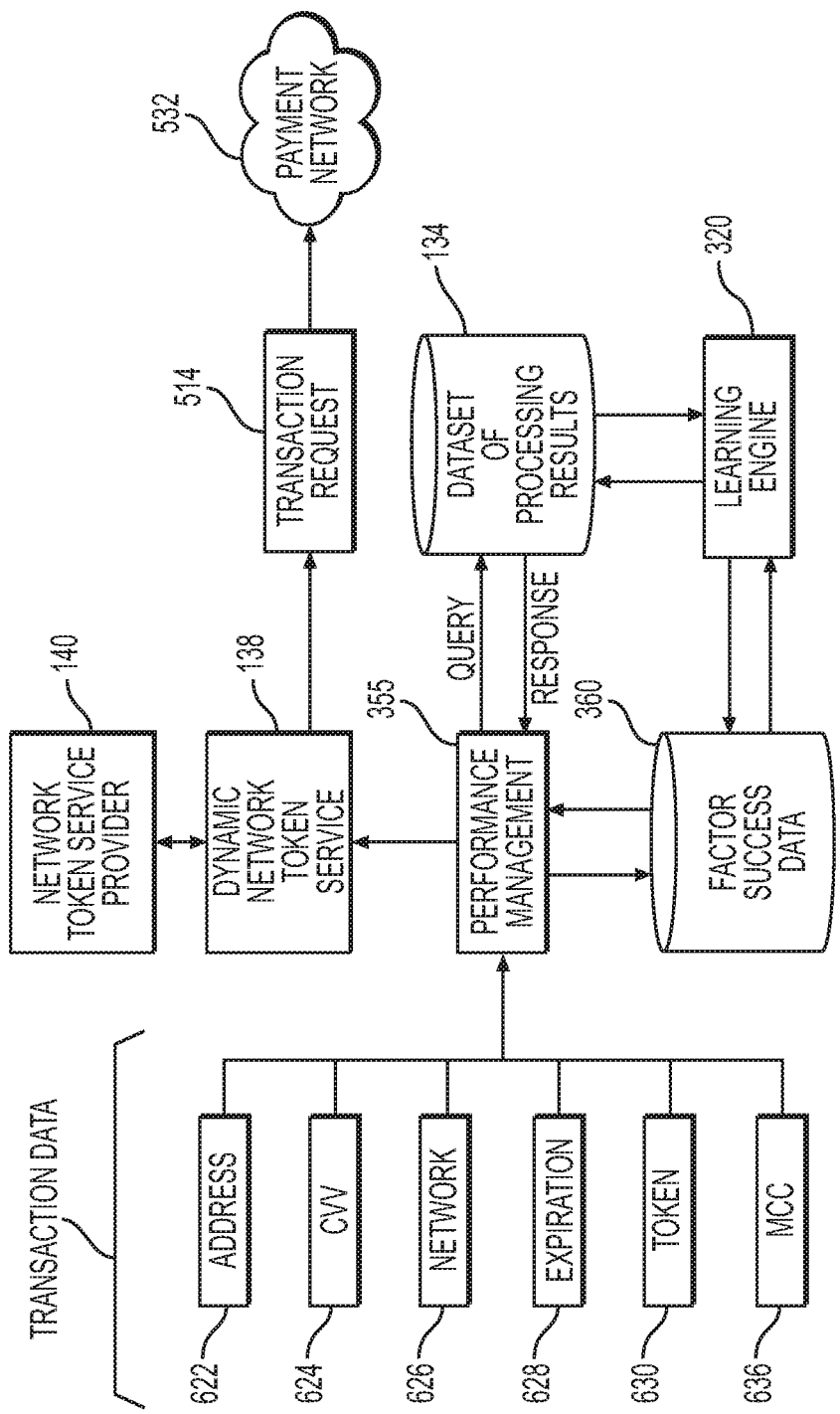
FIG. 6 depicts a block diagram of an example process logic flow and modules for optimizing transaction authorization conversion rates based on the use of network tokens, according to one or more embodiments.

FIG. 6 depicts a block diagram of an example process logic flow and modules for optimizing transaction authorization conversion rates based on the use of network tokens, according to one or more embodiments. As shown in FIG. 6, acquirer processor 508 may receive payment transaction 506. Payment transaction 506 may include transaction data such as, for example, a billing address 622, a card verification value (CVV) 624, a payment processing network 626, a payment vehicle expiration date 628, a payment vehicle issuer token 630, a merchant classification code (MCC) 636. Payment transaction 506 may include additional parameters not shown in FIG. 6. Performance manager 355 of acquirer processor 508 may take in the transaction data for processing. Such processing may include querying dataset of processing results 134 for other potentially corresponding transactions. Performance manager 355 may further read factor success metrics from factor success data 360 as well as issuer preference data 365, as shown in FIG. 5. Based on the corresponding transaction data received from dataset of processing results 134, issuer preference data 365, and the factor success metrics from factor success data 360, performance manager 355 may determine that the likelihood of obtaining authorization for payment transaction 506 from issuer financial institution 518 may be improved by altering the presentation of one or more aspects of the transaction data. For example performance manager 355 may determine that presentation of payment transaction 506 with a network token in place of sensitive information, such as a primary account number (PAN), may improve the likelihood of obtaining authorization. In particular, transaction data received from dataset of processing results 134, issuer preference data 365, and the factor success metrics from factor success data 360 may indicate that the issuer financial institution 518 may preferentially approve transaction requests including a network token over transaction requests including sensitive information.

Use of a network token may be combined with other alterations to the transaction information. For example, performance manager 355 may determine that the likelihood of obtaining authorization for payment transaction 506 from issuer financial institution 518 may be improved by altering the presentation of one or more aspects of the transaction data. For example, performance manager 355 may determine that presentation of payment transaction 506 without billing address information may improve the likelihood of obtaining authorization. In particular, transaction data received from dataset of processing results 134 and the factor success metrics from factor success data 360 may indicate that the issuer financial institution 518 may issue two responses: one indicating overall approval or denial, and one indicating whether transaction information, such as, for example, a supplied billing address, matches account information on file with the issuer financial institution 518. If issuer financial institution 518 is known to authorize transactions lacking certain transaction information and deny transactions having mismatched information, then presenting payment transaction 506 without potentially m may improve the likelihood of obtaining authorization. Similarly, transaction data received from dataset of processing results 134 and the factor success metrics from factor success data 360 may indicate that omitting CVV 624 or expiration date 628 when presenting payment transaction 506 may improve the likelihood of obtaining authorization. In addition, a merchant may qualify for multiple different MCCs based on the nature of the businesses conducted by the merchant. Transaction data received from dataset of processing results 134 and the factor success metrics from factor success data 360 may indicate that one of the available MCCs may have a greater likelihood of obtaining authorization. performance manager 355 may, accordingly, present payment transaction 506 with the MCC with the greatest likelihood of obtaining authorization. Likewise, transaction request 506 may have multiple payment networks 532 available for submission to issuer financial institution 518 for processing. Transaction data received from dataset of processing results 134 and the factor success metrics from factor success data 360 may indicate that one of the available payment networks 532 may yield a greater likelihood of obtaining authorization. Performance manager 355 may, accordingly, select the payment network with the greatest likelihood of obtaining authorization.

Upon completing the processing of payment transaction, performance manager 355 may appropriately modify payment transaction 506 based on the processing of payment transaction 506. For example, if a network token is to be included in payment transaction 506, a network token and cryptogram may be obtained by dynamic network token service 138, such as by a request to network token service provider 140. A modified transaction request 514 may be submitted to issuer financial institution 518 by way of payment network 514.

Figure 7:
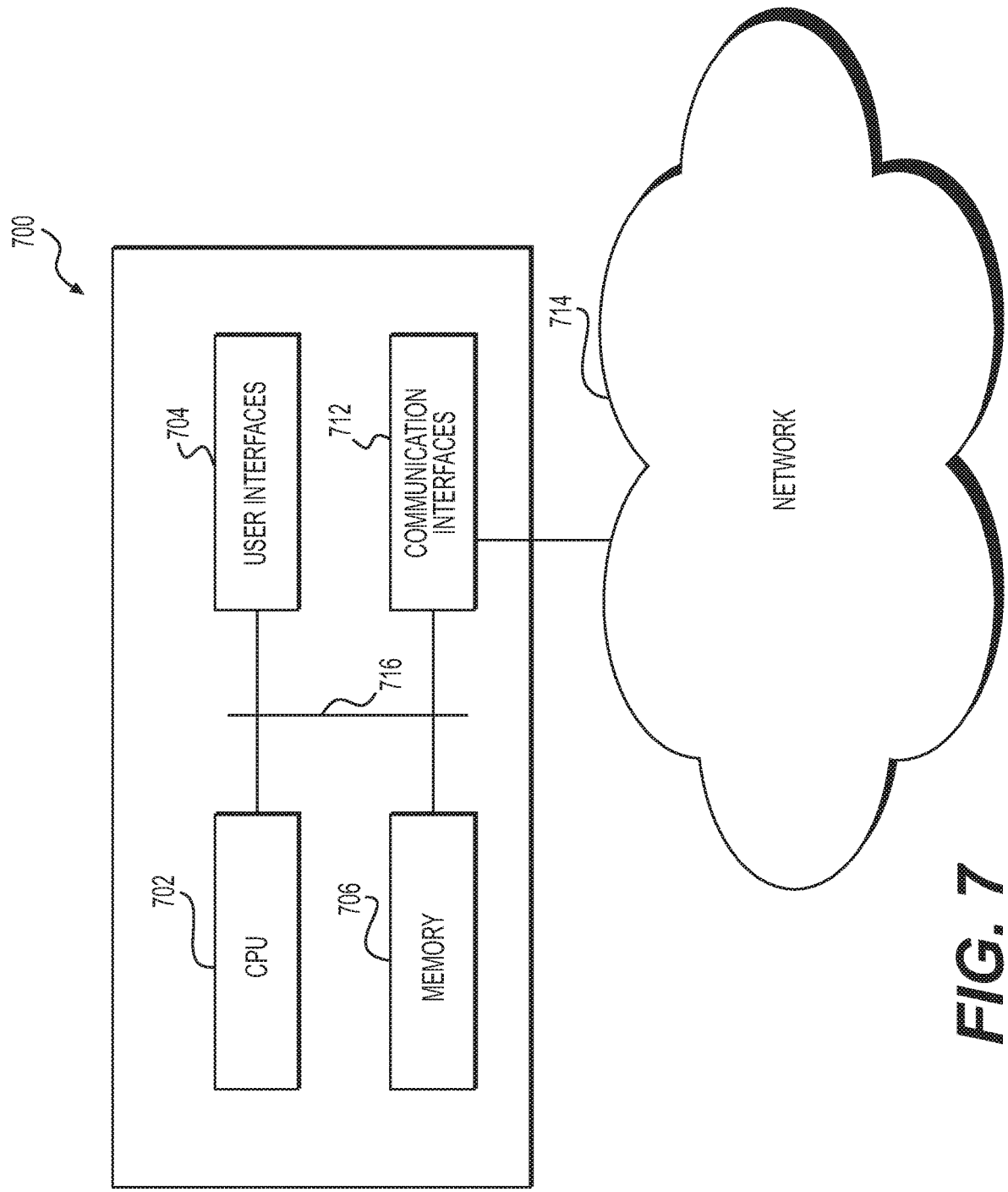
FIG. 7 depicts a computing device for optimizing transaction authorization conversion rates based on the use of network tokens, according to one or more embodiments.

The processes described herein may be performed on or between one or more computing devices that are specially configured to perform the processing described herein. Referring now to FIG. 7, an example computing device 700 is presented. A computing device 700 may be, for example, a server, a computing device that is integrated with other systems or subsystems, a mobile computing device, a cloud-based computing capability, and so forth. The computing device 700 can be any suitable computing device as would be understood in the art, including without limitation, for example, a custom chip, an embedded processing device, a tablet computing device, a POS device 118, a payment processing computing system 124, a payment processing computing system 128, a personal data assistant (PDA), a desktop, a laptop, a microcomputer, a minicomputer, a server, a mainframe, or any other suitable programmable device. According to one or more embodiments, a single component can be replaced by multiple components and multiple components can be replaced by a single component to perform a given function or functions. Except where such substitution would not be operative, such substitution is within the intended scope of the one or more embodiments.

The computing device 700 may include a processor 702 that may be any suitable type of processing unit such as, for example, a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources may further include, for example, distributed computing devices, cloud computing resources, and virtual computing resources in general, etc.

The computing device 700 also may include one or more memories 706 such as, for example, read only memory (ROM), random access memory (RAM), cache memory associated with the processor 702, or other memories such as dynamic RAM (DRAM), static ram (SRAM), programmable ROM (PROM), electrically erasable PROM (EEPROM), flash memory, a removable memory card or disk, a solid state drive, and so forth. The computing device 700 also may include storage media such as, for example, a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 702, or memories 706 are also contemplated as storage devices. It can be appreciated that such memory can be internal or external with respect to operation of the disclosed embodiments. It can be appreciated that certain portions of the processes described herein may be performed using instructions stored on a non-transitory computer-readable medium or media that direct a computer system to perform the process steps. Non-transitory computer-readable media, as used herein, comprises all computer-readable media except for transitory, propagating signals.

Network and communication interfaces 712 may be configured to transmit to, or receive data from, other computing devices 700 across a network 714. The network and communication interfaces 712 may be, for example, an Ethernet interface, a radio interface, a Universal Serial Bus (USB) interface, or any other suitable communications interface and can include receivers, transmitter, and transceivers. For purposes of clarity, a transceiver may be referred to as a receiver or a transmitter when referring to only the input or only the output functionality of the transceiver. Example communication interfaces 712 may include, for example, wired data transmission links such as Ethernet and TCP/IP. The communication interfaces 712 may include, for example, wireless protocols for interfacing with private or public networks 714. For example, the network and communication interfaces 712 and protocols may include interfaces for communicating with private wireless networks such as, for example, a Wi-Fi network, one of the IEEE 802.11x family of networks, or another suitable wireless network. The network and communication interfaces 712 may include interfaces and protocols for communicating with public wireless networks 712, using, for example, wireless protocols used by cellular network providers, including Code Division Multiple Access (CDMA) and Global System for Mobile Communications (GSM), etc. A computing device 700 may use network and communication interfaces 712 to communicate with hardware modules such as, for example, a database or data store, or one or more servers or other networked computing resources. Data may be encrypted or protected from unauthorized access.

According to one or more embodiments, the computing device 700 may include a system bus 716 for interconnecting the various components of the computing device 700, or the computing device 700 may be integrated into one or more chips such as, for example, a programmable logic device or an application specific integrated circuit (ASIC), etc. The system bus 716 may include, for example, a memory controller, a local bus, or a peripheral bus for supporting input and output devices 704, and communication interfaces 712, etc. Example input and output devices 704 may include keyboards, keypads, gesture or graphical input devices, motion input devices, touchscreen interfaces, one or more displays, audio units, voice recognition units, vibratory devices, computer mice, and any other suitable user interface.

The processor 702 and memory 706 may include non-volatile memory for storing, for example, computer-readable instructions, data, data structures, program modules, code, microcode, and other software components for storing the computer-readable instructions in non-transitory computer-readable mediums in connection with the other hardware components for carrying out the methodologies described herein. Software components may include, for example, source code, compiled code, interpreted code, executable code, static code, dynamic code, encrypted code, or any other suitable type of code or computer instructions implemented using any suitable methodology including, for example, high-level, low-level, object-oriented, visual, compiled, or interpreted programming language, etc.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc., are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc., can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A computer-implemented method for optimizing transaction authorization conversion rates based on a use of network tokens, the method comprising:
    identifying, by one or more processors, factors for authorization of transaction requests;
    generating, by the one or more processors, a database of transaction requests using one or more of data science methods or machine learning, wherein the database includes past transactions, associated authorization results, and optimization factors produced by a performance manager based on issuer preferences and factor success data, wherein the factor success data includes data from (i) comparing results for optimized transactions corresponding to test transactions and non-optimized transactions corresponding to control transactions, and (ii) measuring, at a level of a specific issuer and account range, of a sensitivity of an optimization factor among the optimization factors;
    calibrating, by the one or more processors, the optimization factors based on an increase in a rate of chargebacks or fraud alerts that occur when a transaction is approved, wherein the calibrating includes modifying prior rules based on continuing assessment of the results from transactions sent to the specific issuer and account range;
    receiving, at an acquirer processor, a payment transaction from a point of sale (POS) device of a merchant interacting with a user through a user interface of the POS device, wherein the POS device includes a POS terminal or a web interface, and wherein the user interface includes one or more of a magnetic strip reader, a contactless reader, a radio frequency identification reader, a near field communications device, a Bluetooth transceiver, a Wi-Fi transceiver, an infrared transceiver, or a laser scanner;
    determining, at the acquirer processor, whether the payment transaction includes a network token;
    upon determining that the payment transaction does not include a network token, determining, at the acquirer processor, whether the payment transaction should be modified to include a network token based on a likelihood that the payment transaction will be authorized by a financial institution will be increased when the payment transaction includes a network token, wherein the likelihood is determined based on the optimization factors in the database of transaction requests;
    upon determining whether the payment transaction should be modified to include a network token, generating, by a network token service provider, the network token based on the payment transaction;
    obtaining, at the acquirer processor, the network token for the payment transaction from the network token service provider;
    modifying, at the acquirer processor, the payment transaction to include the obtained network token, and, based on (i) the optimization factors and (ii) a likelihood that the payment transaction will be authorized by a financial institution will be increased by further modification;
    determining a merchant classification code having a greatest likelihood of authorization among a plurality of qualifying merchant classification codes for the merchant based on a viewed risk of the qualifying merchant classification codes by the merchant;
    modifying the payment transaction to include the merchant classification code having the greatest likelihood of authorization among the plurality of qualifying merchant classification codes for the merchant, wherein the merchant classification code classifies transactions according to the type of merchant; and
    submitting, at the acquirer processor, the modified payment transaction including the network token and the merchant classification code having the greatest likelihood of authorization to the financial institution for processing.

2. The computer-implemented method of claim 1, wherein the network token is obtained from the network token service provider using a dynamic network token service.

3. The computer-implemented method of claim 1, wherein the likelihood that the payment transaction will be authorized by the financial institution is determined based on predetermined preferences of the financial institution.

4. The computer-implemented method of claim 3, wherein the likelihood that the payment transaction will be authorized by the financial institution is further determined based on authorization success factors for each of a plurality of payment transaction parameters based on parameters retrieved from the payment transaction parameters and authorization results for a plurality of past payment transactions retrieved from the database.

5. The computer-implemented method of claim 4, further comprising:
    comparing the parameters retrieved from the payment transaction to the authorization success factors; and
    modifying each parameter of the payment transaction where the authorization success factors indicate a greater likelihood of authorization of the payment transaction.

6. The computer-implemented method of claim 1, further comprising:
    obtaining a cryptogram corresponding to the obtained network token; and
    providing the cryptogram to the financial institution.

7. The computer-implemented method of claim 6, wherein the obtained cryptogram is provided to the financial institution as part of the payment transaction.

8. The computer-implemented method of claim 1, further comprising:
    receiving a payment transaction authorization result for the submitted modified payment transaction; and upon determining that the payment transaction including the network token was not approved by the financial institution, resubmitting the payment transaction to the financial institution without the network token.

9. A system for optimizing transaction authorization conversion rates based on a use of network tokens, the system comprising:
   a data storage device storing instructions for optimizing transaction authorization conversion rates based on the use of network tokens in an electronic storage medium; and
   one or more processors configured to execute the instructions to perform a method including:
   identifying, by the one or more processors, factors for authorization of transaction requests;
   generating, by the one or more processors, a database of transaction requests, in the data storage device, using one or more of data science methods or machine learning, wherein the database includes past transactions, associated authorization results, and optimization factors produced by a performance manager based on issuer preferences and factor success data, wherein the factor success data includes data from (i) comparing results for optimized transactions corresponding to test transactions and non-optimized transactions corresponding to control transactions, and (ii) measuring, at a level of a specific issuer and account range, of a sensitivity of an optimization factor among the optimization factors;
   calibrating, by the one or more processors, the optimization factors based on an increase in a rate of chargebacks or fraud alerts that occur when a transaction is approved, wherein the calibrating includes modifying prior rules based on continuing assessment of the results from transactions sent to the specific issuer and account range;
   receiving, at an acquirer processor, a payment transaction from a point of sale (POS) device of a merchant interacting with a user through a user interface of the POS device, wherein the POS device includes a POS terminal or a web interface, and wherein the user interface includes one or more of a magnetic strip reader, a contactless reader, a radio frequency identification reader, a near field communications device, a Bluetooth transceiver, a Wi-Fi transceiver, an infrared transceiver, or a laser scanner;
   determining, at the acquirer processor, whether the payment transaction includes a network token;
   upon determining that the payment transaction does not include a network token, determining, at the acquirer processor, whether the payment transaction should be modified to include a network token based on a likelihood that the payment transaction will be authorized by a financial institution will be increased when the payment transaction includes a network token, wherein the likelihood is determined based on the optimization factors in the database of transaction requests;
   upon determining whether the payment transaction should be modified to include a network token, generating, by a network token service provider, the network token based on the payment transaction;
   obtaining, at the acquirer processor, the network token for the payment transaction from the network token service provider;
   modifying, at the acquirer processor, the payment transaction to include the obtained network token, and, based on (i) the optimization factors and (ii) a likelihood that the payment transaction will be authorized by a financial institution will be increased by further modification;
   determining a merchant classification code having a greatest likelihood of authorization among a plurality of qualifying merchant classification codes for the merchant based on a viewed risk of the qualifying merchant classification codes by the merchant;
   modifying the payment transaction to include the merchant classification code having the greatest likelihood of authorization among the plurality of qualifying merchant classification codes for the merchant, wherein the merchant classification code classifies transactions according to the type of merchant; and
   submitting, at the acquirer processor, the modified payment transaction including the network token and the merchant classification code having the greatest likelihood of authorization to the financial institution for processing.

10. The system of claim 9, wherein the likelihood that the payment transaction will be authorized by the financial institution is determined based on predetermined preferences of the financial institution.

11. The system of claim 10, wherein the likelihood that the payment transaction will be authorized by the financial institution is further determined based on authorization success factors for each of a plurality of payment transaction parameters based on parameters retrieved from the payment transaction parameters and authorization results for a plurality of past payment transactions retrieved from the database.

12. The system of claim 11, wherein the system is further configured for:
   comparing the parameters retrieved from the payment transaction to the authorization success factors; and
   modifying each parameter of the payment transaction where the authorization success factors indicate a greater likelihood of authorization of the payment transaction.

13. A non-transitory machine-readable medium storing instructions that, when executed by a computing system, causes the computing system to perform a method for optimizing transaction authorization conversion rates based on a use of network tokens, the method including:
   identifying, by one or more processors, factors for authorization of transaction requests;
   generating, by the one or more processors, a database of transaction requests using one or more of data science methods or machine learning, wherein the database includes past transactions, associated authorization results, and optimization factors produced by a performance manager based on issuer preferences and factor success data, wherein the factor success data includes data from (i) comparing results for optimized transactions corresponding to test transactions and non-optimized transactions corresponding to control transactions, and (ii) measuring, at a level of a specific issuer and account range, of a sensitivity of an optimization factor among the optimization factors;
   calibrating, by the one or more processors, the optimization factors based on an increase in a rate of chargebacks or fraud alerts that occur when a transaction is approved, wherein the calibrating includes modifying prior rules based on continuing assessment of the results from transactions sent to the specific issuer and account range;

receiving, at an acquirer processor, a payment transaction from a point of sale (POS) device of a merchant interacting with a user through a user interface of the POS device, wherein the POS device includes a POS terminal or a web interface, and wherein the user interface includes one or more of a magnetic strip reader, a contactless reader, a radio frequency identification reader, a near field communications device, a Bluetooth transceiver, a Wi-Fi transceiver, an infrared transceiver, or a laser scanner;

determining, at the acquirer processor, whether the payment transaction includes a network token;

upon determining that the payment transaction does not include a network token, determining, at the acquirer processor, whether the payment transaction should be modified to include a network token based on a likelihood that the payment transaction will be authorized by a financial institution will be increased when the payment transaction includes a network token, wherein the likelihood is determined based on the optimization factors in the database of transaction requests;

upon determining whether the payment transaction should be modified to include a network token, generating, by a network token service provider, the network token based on the payment transaction;

obtaining, at the acquirer processor, the network token for the payment transaction from the network token service provider;

modifying, at the acquirer processor, the payment transaction to include the obtained network token, and, based on (i) the optimization factors and (ii) a likelihood that the payment transaction will be authorized by a financial institution will be increased by further modification;

determining a merchant classification code having a greatest likelihood of authorization among a plurality of qualifying merchant classification codes for the merchant based on a viewed risk of the qualifying merchant classification codes by the merchant;

modifying the payment transaction to include the merchant classification code having the greatest likelihood of authorization among the plurality of qualifying merchant classification codes for the merchant, wherein the merchant classification code classifies transactions according to the type of merchant; and submitting, at the acquirer processor, the modified payment transaction including the network token and the merchant classification code having the greatest likelihood of authorization to the financial institution for processing.

14. The non-transitory machine-readable medium of claim 13, wherein the network token is obtained from the network token service provider using a dynamic network token service.

15. The non-transitory machine-readable medium of claim 13, wherein the likelihood that the payment transaction will be authorized by the financial institution is determined based on predetermined preferences of the financial institution.

16. The non-transitory machine-readable medium of claim 15, wherein the likelihood that the payment transaction will be authorized by the financial institution is further determined based on authorization success factors for each of a plurality of payment transaction parameters based on parameters retrieved from the payment transaction parameters and authorization results for a plurality of past payment transactions retrieved from the database.

17. The non-transitory machine-readable medium of claim 16, the method further comprising:
comparing the parameters retrieved from the payment transaction to the authorization success factors; and
modifying each parameter of the payment transaction where the authorization success factors indicate a greater likelihood of authorization of the payment transaction.

18. The non-transitory machine-readable medium of claim 13, the method further comprising:
obtaining a cryptogram corresponding to the obtained network token; and
providing the cryptogram to the financial institution.

19. The non-transitory machine-readable medium of claim 18, wherein the obtained cryptogram is provided to the financial institution as part of the payment transaction.

20. The non-transitory machine-readable medium of claim 13, the method further comprising:
receiving a payment transaction authorization result for the submitted modified payment transaction; and
upon determining that the payment transaction including the network token was not approved by the financial institution, resubmitting the payment transaction to the financial institution without the network token.

* * * * *